United States Patent [19]

Moh et al.

[11] Patent Number: 5,077,241

[45] Date of Patent: Dec. 31, 1991

[54] SOL GEL-DERIVED CERAMIC BUBBLES

[75] Inventors: Kyung H. Moh; Harold G. Sowman; Thomas E. Wood, all of St. Paul, Minn.

[73] Assignee: Minnesota Mining and Manufacturing Company, St. Paul, Minn.

[21] Appl. No.: 272,526

[22] Filed: Nov. 17, 1988

[51] Int. Cl.$^5$ .................. C03C 3/32; C04B 38/02; C04B 38/10; C04B 35/58

[52] U.S. Cl. .................................. 501/84; 501/12; 501/33; 501/40; 501/80; 501/85; 501/96; 501/97

[58] Field of Search .................. 501/80, 81, 82, 83, 501/84, 85, 96, 97, 12, 33, 39, 40, 87

[56] References Cited

U.S. PATENT DOCUMENTS

| | | | |
|---|---|---|---|
| 2,978,340 | 4/1961 | Veatch et al. | 106/40 |
| 3,709,706 | 1/1973 | Sowman | 106/57 |
| 3,792,136 | 2/1974 | Schmitt | 264/44 |
| 3,975,194 | 8/1976 | Farnand et al. | 75/222 |
| 4,039,480 | 8/1977 | Watson et al. | 252/455 |
| 4,279,632 | 7/1981 | Frosch | 65/21.4 |
| 4,290,847 | 9/1981 | Johnson et al. | 176/1 |
| 4,349,456 | 9/1982 | Sowman | 252/317 |
| 4,421,562 | 12/1983 | Sands | 106/75 |
| 4,637,990 | 1/1987 | Torobin | 502/10 |
| 4,772,511 | 9/1988 | Wood et al. | 428/325 |
| 4,777,154 | 10/1988 | Torobin | 501/84 |

FOREIGN PATENT DOCUMENTS 62-191426  8/1987  Japan .

OTHER PUBLICATIONS

U.S.S.N. 07/314,752, "Thin Silica Flakes and Method of Making".

A. Westwood et al., "High Technology Ceramics", Cutting Edge Technologies, National Academy of Engineering, National Academy Press, Washington, DC, (1984), pp. 117–130.

U.S.S.N. 151,819, "High Stability Porous Zirconium Oxide Spherules".

Chemical Abstracts, vol. 107, No. 20, Nov., 1987, p. 389, Abstract No. 182128f, Columbus, Ohio.

Primary Examiner—William R. Dixon, Jr.
Assistant Examiner—Michael A. Marcheschi
Attorney, Agent, or Firm—Gary L. Griswold; Walter N. Kirn; Lorraine R. Sherman

[57] ABSTRACT

Discrete, free-flowing, ceramic microbubbles consist essentially of at least one of a non-oxide component and an oxide component having diameters in the range of 1 to 300 micrometers and each having a wall thickness of less than 10 percent of the diameter of the bubble. In the process of the invention, a sol precursor and a suitable liquid, referred to as a bloating agent, when added to a bubble promoting medium under proper conditions, provide green gelled microbubbles which after firing are ceramic microbubbles having wall thicknesses less than 10 percent of the diameter of the bubbles. The microbubbles are non-vitreous, sol-gel derived, fine microstructured, uniform, hollow, smooth, and are either essentially all oxide or non-oxide or combinations of both.

26 Claims, 2 Drawing Sheets

SOL GEL-DERIVED CERAMIC BUBBLES

FIELD OF THE INVENTION

This invention relates to sol-gel derived fine microstructured ceramic oxide and non-oxide microbubbles. In another aspect, the invention relates to a process for preparing such microbubbles. The microbubbles are useful as abrasives, in low density structural composites, as fillers, catalyst substrates, machinable refractories, and as controlled release drug carriers.

BACKGROUND OF THE INVENTION

Use of ceramics in fiber form and in composites is well known. Ceramics, especially in solid spherical form, useful as catalyst supports, catalysts, reflective materials, and abrasives, are also well known. In recent years, many ceramics have been made using the sol-gel process.

The sol-gel process is well known in the art—see for example U.S. Pat. Nos. 4,349,456, 3,709,706, and 4,290,847. A general reference on modern technology is A. Westwood et al., "High Technology Ceramics", Cutting Edge Technologies, National Academy of Engineering, National Academy Press, Washington, D.C. (1984) pages 117 to 130.

Preparation of hollow, ceramic microspheres by spray drying is taught in U.S. Pat. No. 4,421,562. A shortcoming of this technique is that the spheres suffer from holes and cracks.

U.S. Pat. No. 4,637,990 describes hollow, ceramic, porous microspheres prepared by a blowing technique. The resultant ceramic microspheres have diameters of 2000 to 4000 micrometers; smaller size bubbles are not taught.

U.S. Pat. No. 4,279,632 discloses a method and apparatus for producing concentric hollow spheres by a vibration technique on extruded materials to break up the material into individual, spherical bodies. This method is useful with low melting point material such as glass or metal which is fluid at elevated operating temperatures.

Non-vitreous ceramic metal oxide microcapsules and a process for making such microcapsules from sol-gel precursors is described in U.S. Pat. No. 4,349,456. The gel bubbles produced by this method are filled with organic dehydrating liquid which must be removed with considerable care to prevent fracture of the bubbles.

Hollow ceramic balls prepared by a combination of coating, sintering, and reduction are disclosed in U.S. Pat. No. 4,039,480; however, the process is complex, and the balls so obtained are large (e.g., 5 by 7 mesh size which is 2.79 to 3.96 millimeters).

Ceramic metal oxide microspheres prepared by impregnating hollow, organic resin microspheres with a metal compound and firing to remove adjuvants is disclosed in U.S. Pat. No. 3,792,136. The resultant hollow microspheres generally have large diameters of 50 micrometers to 10 millimeters (mm) and in one example, when the average diameter was 3 mm, the wall thickness is disclosed to be 17 micrometers.

U.S. Pat. No. 2,978,340 describes inorganic microspheres prepared from a fusion (melt or vitreous) process using a gassing agent. The product is not uniform in size, and the microspheres are not all hollow.

U.S. Pat. No. 3,975,194 teaches hollow microballoons prepared by an involved process. The resultant balloons have a non-uniform cross-section.

U.S. Pat. No. 4,772,511 discloses using vegetable oils or derivatives thereof as forming media for the preparation of zirconia based ceramic beads.

SUMMARY OF THE INVENTION

Briefly, the present invention provides discrete, free-flowing, ceramic microbubbles consisting essentially of at least one of a non-oxide component (or phase) and an oxide component (or phase), each microbubble having a ceramic wall and a single central cavity, the microbubbles having diameters in the range of 1 to 300 micrometers ($\mu$m) and wall thicknesses of less than 10 percent of the diameter of the bubbles.

The present invention provides non-vitreous, sol-gel derived, fine microstructured, uniform, hollow, smooth, oxide containing and non-oxide containing ceramic microbubbles. Preferably the microbubbles have wall thicknesses of 0.5 to about 8 percent of the diameter of the bubbles. Microbubbles of the invention can be essentially all oxide or all non-oxide or they can be a combination of oxide and non-oxide. The oxide component may be present in a solid solution with the non-oxide component, or the two components may be in admixture with each other (ratio of components being essentially 0:100 to 100:0 parts by weight) as separate phases identifiable by X-ray diffraction analysis (XRD). Particularly useful bubbles have a composition of non-oxide to oxide components in the range of 95:5 to 5:95 parts by weight. These ratios may be determined by X-ray diffraction analysis. Bubbles of this invention may consist essentially of all oxide phases or all non-oxide phases or they may be made up of a mixture with at least one of the nitride, carbide and oxide phases. Especially useful are bubbles which are essentially 100 weight percent non-oxide containing; although those containing less than 5 weight percent oxide are also useful.

In another aspect the present invention provides shaped ceramic articles containing sol-gel derived, fine microstructured, oxide and non-oxide containing ceramic bubbles.

In a further aspect, this invention teaches a sol-gel process which provides a high yield of high quality (uniform size and shape), thin-walled oxide containing and non-oxide containing ceramic microbubbles. A sol precursor and a suitable liquid, referred to as a bloating agent, when added to a bubble promoting medium under the proper conditions, provide green gelled microbubbles which, after firing, are ceramic microbubbles having wall thicknesses less than 10 percent of the diameter of the bubbles. The process provides microbubbles having encapsulated therein gases or combinations of gases depending on the conditions under which the bubbles are formed.

The process of the present invention provides a firing temperature range significantly below, preferably about 300° C. below, that range known in the art to convert oxide containing ceramics to non-oxide containing ceramics.

What the background has not taught but what this invention teaches is non-vitreous, sol-gel derived, fine microstructured, thin walled, hollow non-oxide containing ceramic microbubbles of uniformly spherical shape and with diameters in the range of 1 to 300 micrometers and which preferably have wall thicknesses of about 0.5 to about 8 percent of the diameter of the bubbles, more preferably 0.5 to 5 percent of the diameter of the bubbles, shaped articles containing the bubbles, and a process therefor. The bubbles may also be referred to as thin-walled, hollow microspheres and are useful as abrasives, catalyst supports, insulating materials and the like.

As used in this application:

"sol precursor" or "sol-gel precursor" means a liquid (solution or dispersion or mixture thereof) which can contain metal salts, basic metal salts, hydrolyzable metal complexes such as alkoxides, colloidal dispersions of inorganic solids such as oxides, hydroxides, oxyhydroxides or mixtures thereof, and adjuvants such as film forming agents;

"ceramic" means any inorganic nonmetallic material (including metal oxides, carbides, and nitrides) which requires the application of high temperatures at some stage in its manufacture;

"essentially all oxide or non-oxide" means that by standard powder X-ray diffraction analysis only the oxide or non-oxide phase is detected.

"sol-gel" is a term used in the ceramic art and is applied to the preparation of ceramics from sol or solution precursors or combinations thereof;

"film forming agent" means any chemical substance, generally a polymer, which, when added to a sol precursor or mixtures thereof, induces film formation during removal of solvent; that is, the surface of the liquid increases in viscosity during removal of solvent resulting in a skin or film on the surface. It is believed that upon removal of solvent the induced concentration of the film forming agent at the solution surface causes an increase in viscosity that forms the "skin" or film;

"adjuvants" means substances which may be present in the inventive compositions including fluxing agents such as soda (e.g., introduced as sodium carbonate), boria, or phosphorus pentoxide and fugitive polymeric additives such as methylcellulose in the precursor mixtures which can help to generate more uniformity of wall thickness and size in bubble formation;

"bloating agent" means any liquid having a boiling point at or below the temperature of the bubble promoting medium, having high solubility or miscibility in the sol precursor, and which induces rapid expansion of the nascent bubbles upon heating;

"non-vitreous" means that a ceramic has not been derived from a melt or mixture of raw materials brought to the liquid state at high temperature, such as in a molten glass As used, this term distinguishes the inventive ceramic hollow microspheres over glass composition bubbles which are made by a melt process;

"fired" or "fired solids" means the actual oxide equivalent, the weight percent of which is obtained by weighing a sample, drying and firing it to a temperature sufficient to remove fugitive components and to convert to the oxide, e.g., at a temperature of 400° C. and above, preferably in the range of 600° to 1000° C., to remove water and organic substances and any other volatile components, weighing the fired sample and dividing this fired weight by the initial sample weight and multiplying the quotient by 100;

"transparent" means that the walls of the fractured hollow ceramic microbubbles or spheres when viewed under an optical microscope (e.g., at 100×), have the property of transmitting rays of visible light so that bodies beneath the microbubble wall, for example, such as bodies having essentially the same nature as the microbubbles, can be clearly seen through the walls of the microbubbles. A recommended procedure would be to observe the bubble fragments submerged in clear oil. The refractive index of the oil should not be so close to that of the walls of the hollow microbubbles such that they seem to disappear (as would be the case of a perfect index match). When whole intact bubbles are examined under the microscope, the hollow space inside the bubbles appears dark because of the mismatch of the refractive index of air and oil. Not all bubbles of this invention are transparent or even translucent. Many, for example those of predominantly carbide-containing compositions, are opaque;

"fully dense" means that walls of the bubbles are close to theoretical density and having substantially no open porosity (i.e. less than 4 volume percent pores) detectable by standard analytical techniques such as the B. E. T. nitrogen technique (based upon adsorption of nitrogen molecules from a gas with which a specimen is contacted). Such measurements yield data on the surface area per unit weight of a sample (e.g. $m^2/g$). Density can be measured on wall fragments by mercury pycnometric or porosimetry procedures. Higher specific surface ($m^2/g$) indicates higher surface irregularities and/or porosity. Surface area and porosity measurements may be made on a Quantasorb TM apparatus made by Quantachrome Corporation, Syossett, N.Y.;

"grain" means 1) crystallites in crystalline materials, and 2) domains or colloidal particles in amorphous materials;

"microstructure" means the structure and size of the primary crystallites which make up a ceramic body and the packing of these crystallites into arrays and the structure of such arrays and three dimensional networks derived from the crystallites. A fine "microstructure" indicates that the material is composed of very small crystallites (generally about 1 micrometer in diameter or less in the case of equiaxed crystallites);

"equilibrium boiling point method" means a method for forming the microbubbles wherein a sol precursor, in the form of droplets which is mixed with, or contains a certain amount of a low boiling liquid, referred to as a bloating agent, is atomized and added dropwise into a hot, stirred liquid bubble promoting medium; after a certain period of time depending on the sol droplet size, those droplets reach the equilibrium boiling point and the gel particles bloat as the gases inside expand. When the density of the bloated bubbles falls below the density of the bubble promoting medium, the equilibrium boiling point has been reached and the particles rise in the bubble promoting medium and float on the surface thereof;

"green" means an unfired gelled article convertible to a ceramic article by firing; and "agglomeration preventative agent" means a decomposable carbon containing compound which may be in bulk form or mixture of compounds which is admixed with the green gelled microbubbles of the invention prior to firing; the presence of such an agent prevents cohesion of the microbubbles.

DESCRIPTION OF THE DRAWING

The drawing, is represented by FIGS. 1–3.

DETAILED DESCRIPTION AND SPECIFICATION OF THE INVENTION

Figure 1:
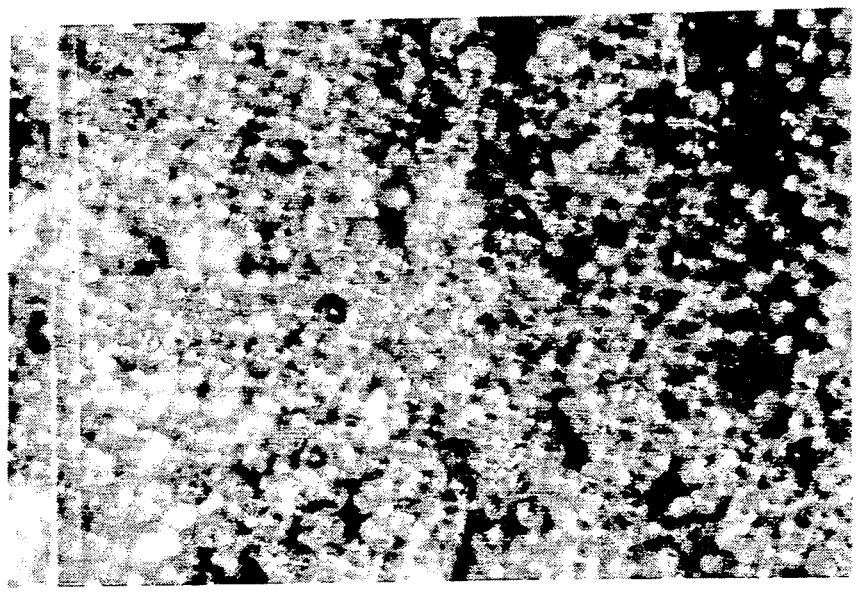
FIG. 1 shows a light microscopic photograph of $3Al_2O_3.1B_2O_3.2SiO_2$ composition ceramic microbubbles of the present invention enlarged 250 times (250×).
Figure 2:
FIG. 2 shows a scanning electron microscope (SEM) photograph of the $3Al_2O_3.1B_2O_3.2SiO_2$ composition ceramic microbubbles of the invention (10-50 μm size range) enlarged 300 times (300×).
Figure 3:
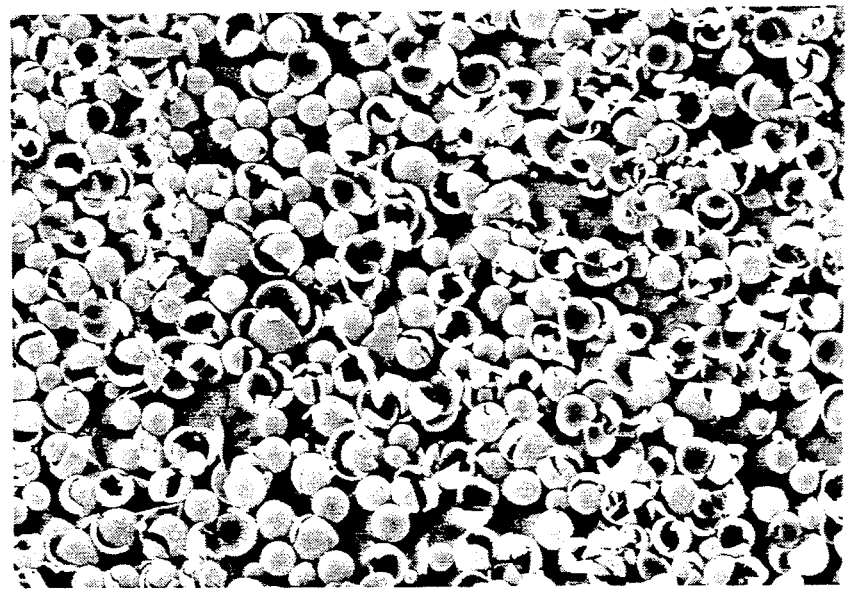
FIG. 3 shows a scanning electron microscope (SEM) photograph of deliberately crushed microbubbles of FIG. 2 [enlarged 300 times (300×)], to demonstrate the thin walls (shells) of the bubbles. Bubbles were crushed by pressing the microbubbles of FIG. 2 between microscope slides.

In one aspect, the present invention provides a process for the preparation of fine microstructured, hollow, smooth, oxide and non-oxide containing ceramic bubbles comprising the steps of:
(1) providing a mixture containing a ceramic sol precursor and a volatile liquid, the volatile liquid being referred to herein as bloating agent,
(2) adding the above mixture, preferably as droplets, at a suitable rate and manner to a provided bubble promoting medium maintained at a suitable temperature to allow formation of green hollow microbubbles; preferably the bubble promoting medium is a liquid such as an aliphatic alcohol, e.g. oleyl alcohol, or a long chain carboxylic acid ester such as peanut oil, or mixtures thereof, or mixtures of oleyl alcohol with other vegetable oils or vegetable oil derivatives,
(3) isolating the green microbubbles, preferably by filtration,
(4) firing the green microbubbles, optionally mixed with an agglomeration preventative agent to provide a source of carbon, in air for oxide containing ceramic microbubbles or in an inert or reducing atmosphere for non-oxide containing microbubbles, and at a range of temperature sufficient to convert the green microbubbles into an oxide or non-oxide containing ceramic, and
(5) collecting the fired ceramic microbubbles.

Adding a source of carbon such as wood cellulose to the gelled microbubbles serves to:
a) prevent agglomeration of bubbles during processing,
b) in the case where non-oxide containing microbubbles are desired, a source of carbon assists in converting the microbubbles to non-oxide containing microbubbles.

When the firing of the gelled or green ceramic microbubbles takes place in the presence of an inert or reducing atmosphere and at a sufficiently high temperature, the green, oxide containing ceramic microbubbles can be converted into non-oxide containing ceramic microbubbles; the preferred atmosphere is nitrogen or argon.

Sol precursors useful for preparing the hollow, oxide-containing, ceramic microbubbles of the present invention are well known in the art and include those for preparing alumina, alumina-magnesia, barium titanate, mullite, alumina-silica (U.S. Pat. No. 4,047,965), alumina-boria and alumina-boria-silica (see U.S. Pat. No. 3,795,524), titania (U.S. Pat. No. 4,166,147), silica, zirconia, zirconia-silica (U.S. Pat. Nos. 3,709,706 and 3,793,041), zirconia-yttria, zirconia-magnesia, zirconia-calcia, zirconia-ceria, and other zirconia-containing materials (U.S. Pat. No. 4,772,511), thoria-silica-metal (III) oxide (U.S. Pat. No. 3,909,278) and alumina-chromia-metal (IV) oxide (U.S. Pat. No. 4,125,406).

Representative examples of sol precursors include zirconyl acetate, aluminum formoacetate, tetraisopropyl titanate, and those disclosed in U.S. Pat. No. 4,349,456. Sol precursors useful for preparing non-oxide containing ceramic microbubbles may also include those containing metal and non-metal nitride and carbide colloidal particles. Concentration of the sol precursor will depend on the nature of the sol ingredients but will generally be in the range of 9 to 22 weight percent solids. Density of the sol precursor can be in the range of 1.1 to 1.5 g/cc. Viscosity of the sol precursor can be in the range of 50 to 1000 cP, preferably in the range of 500 to 800 cP.

A bloating agent for use in the present invention includes any liquid added to the sol precursor or its mixtures, which induces bloating or expansion of the droplet upon heating. This expansion is believed to be the result of the rapid formation of a gas or vapor which is composed mainly of the vaporized bloating agent within the nascent gel bubble. The bloating agent is characterized by a boiling point below the temperature of the bubble promoting medium and a moderate to high solubility or miscibility in the sol precursor or its mixtures. Any volatile compound having a boiling point at or below the temperature of the bubble promoting medium can be useful in the formation of the microbubbles. Representative examples include liquids which boil in the range of 25° to 100° C. at atmospheric pressure (760 Torr) and include halocarbons such as chloroform, aldehydes such as formaldehyde, ethers, alcohols such as ethanol and methanol, and ketones such as acetone and methyl ethyl ketone, and combinations thereof such as a mixture of liquid halocarbons (e.g. Freon TM 11, Dupont, Wilmington, Del. and Genetron TM 11, Allied Chemical Co., Morristown, N.J.) and methanol (1/1 vol/vol). Preferred bloating agents include acetone, and a (1/1 vol/vol) liquid Freon 11 and methanol mixture.

A bloating agent useful in the present invention exhibits complete volatility at or below the gel-forming temperature in the equilibrium boiling point method of this invention. Suitable bloating agents include organic liquids having a boiling point below that of the bubble promoting medium and miscible with the sol precursor. The bloating agent or mixtures thereof has solubility or miscibility (of at least 5 wt. percent) in the sol precursor. The miscibility or solubility of the bloating agent can be affected by choice of the liquid used in the precursor.

A bubble promoting medium for use in the present invention refers to a liquid at the temperature of bubble formation, to which a mixture of the sol precursor and bloating agent, in the form of droplets, is added with subsequent conversion to bubbles by the equilibrium boiling point process and wherein the bubbles become rigid during the sol-gel process. Useful bubble promoting media include esters of long chain fatty acids having at least 8 carbon atoms, vegetable oils, such as corn oil, safflower oil, soybean oil, sunflower oil, peanut oil, and various derivatives of these oils and combinations thereof, and long chain alcohols having at least 8 carbon atoms and up to 20 carbon atoms such as oleyl alcohol, and mixtures thereof and combinations of any of these carboxylic acid esters, alcohols and oils. Especially useful bubble promoting media are oleyl alcohol and mixtures of oleyl alcohol with peanut oil, especially a 1/1 (vol/vol) mixture thereof.

Sol-gel processes for preparing shaped ceramic articles are well known in the art and have been taught in the art; see for example U.S. Pat. Nos. 4,349,456, 3,709,706, and 4,290,847. Generally, a sol-gel process is one which converts a colloidal dispersion, sol, aquasol, or hydrosol of a metal oxide, or precursor thereof, to a gel. A gel is a material wherein one or more of the components are crosslinked either chemically or physically to such an extent as to cause a three dimensional network to form. The formation of this network results in an increase in viscosity of the mixture and a mechanical immobilization of the liquid phase within the network. The sol-gel process also has the advantage of enabling the use of a lower processing temperature than glass bubble forming processes and thus requires less energy consumption per unit weight produced.

In the method of the present invention, high quality, thin-walled, green ceramic microbubbles are produced by a sol-gel process which exploits the phenomenon of formation of these microbubbles by adding dropwise a mixture of sol precursors and a liquid bloating agent to a bubble promoting medium and controlled gelation of the resultant microbubbles (equilibrium boiling point method). We have found that a combination of pressurized air (in the range of 0.4 to 1.1 $kg/cm^2$) and pressurized sol precursor (in the range of 0.4 to 1.1 $kg/cm^2$) results in the sol precursor forming micro size (e.g., less than 200 micrometers) droplets when sprayed through an atomizing nozzle as is known in the art. The ratio of sol to bloating agent depends on the nature of the sol. Generally, the ratio, in parts by volume of sol precursor to bloating agent can be in the range of (70 to 99):(1 to 30). The ratio of sol precursor to bubble promoting medium can be the range of (1 to 20):(80 to 99) parts by volume.

The gelling step is often followed by drying the formed microbubbles to provide a green (unfired) product and then firing the green microbubbles to provide a refractory ceramic material stable at high temperatures.

We discovered that a sol precursor droplet, which contains a certain amount of a low boiling liquid (referred to as a bloating agent) such as acetone or ethanol preferably 1:1 vol/vol liquid halocarbon and methanol, bloats or becomes a bubble when dropped into a hot liquid (referred to as a bubble promoting medium). We further discovered that if the droplet is induced to gel concurrently with bloating, the resultant green, gelled bubbles are obtained, which, when isolated and fired, provide strong, well formed ceramic microbubbles.

Gelling can be induced by one or a combination of methods the choice of which depends on the nature of the precursor solution. Often, as is taught in U.S. Pat. No. 4,349,456, sols containing basic metal salts can be dehydratively gelled, that is through removal of water from the sol droplet by the forming medium. As is disclosed in U.S. Pat. No. 2,689,226, incorporation of an adjuvant in the sol precursor such as hexamethylenetetramine which will thermally decompose to generate ammonia can be utilized in certain systems to gel the nascent bubble. Other methods to induce gelation include addition of a weak base as is taught in U.S. Pat. No. 2,666,749 and controlled removal of the metal counterion (see, for example, J. L. Woodhead and D. L. Segal Br. Ceram. Proc., 36 (1985) 123–128). Variations and limitations of these techniques are apparent to those skilled in the art.

While not being bound by theory, it is believed that droplets or microdroplets of a mixture of the sol precursor with a liquid bloating agent, on addition to a temperature controlled bubble promoting medium, bloat and become microbubbles. It is believed that the low boiling bloating agent, on contact with the hot bubble promoting medium, vaporizes, and the resultant vapors or gases cause bubble formation. This overall process is referred to as the equilibrium boiling point method.

In a preferred embodiment, the immersion of a droplet comprising a mixture of bloating agent and sol into hot oleyl alcohol (bubble promoting medium) produces high quality green microbubbles. The present invention provides bubbles filled with gas (e.g. air, gas, vapor, and the like), rather than bubble promoting medium. Walls of the green hollow microbubbles can be made fully dense by firing the green microbubbles to a sufficiently high temperature.

In the gelation process, the bubble promoting medium is characterized by: low solubility (e.g. less than 1 weight percent) for the sol precursor and other sol ingredients including adjuvants; a reasonable degree of stability within the temperature range of use; inertness to chemical precursors (e.g. sol precursors, adjuvants, agglomeration preventative additive, etc.) of the resultant ceramic; and a possibility of recovering (by appropriate processing, e.g., to remove water, acetic acid and the like) and recycling the medium.

The temperature of the bubble promoting medium is maintained in the range of 50° to 150° C., preferably 8° to 100° C., most preferably at 90°–97° C. (all temperatures stated in this invention are in degrees Centigrade unless indicated otherwise). Preferably the bubble promoting medium is oleyl alcohol. Mixtures of oleyl alcohol with oils such as vegetable oil, corn oil, safflower oil, soybean oil, sunflower oil, peanut oil and various derivatives of these oils can also be used. A mixture of oleyl alcohol with peanut oil is a convenient medium.

The bubble promoting medium can be recovered after microbubble formation by filtration, regenerated by heating the resultant filtrate briefly above about 118° C. (for example to remove water and residual acetic and formic acids from sol precursors such as metal acetates and metal formoacetates), and then used for bubble formation.

To prepare mullite ceramic microbubbles for example, a sol precursor, comprised of a mixture of basic aluminum carboxylate, colloidal silica, and an adjuvant such as a stabilizing agent (e.g. lactic acid as described in U.S. Pat. Nos. 3,795,524 and 4,047,965 on aluminum borosilicate fibers), is generally concentrated (typically to about 20 weight percent fired solids) prior to the addition of a second mixture comprised of a bloating agent and optional adjuvants which can include a filmforming agent, such as methyl cellulose (Methocel TM Dow Chemical Co., Midland, Mich.) or polyvinylpyrrolidone such that the resultant mixture has a convenient density and viscosity (e.g. density=1.1 to 1.5 g/cc, preferably about 1.2 g/cc and the viscosity is in the range of 50 to 1000 cP, preferably about 500 cP) to allow droplet or microdroplet formation when this mixture is added through an atomizer into a bubble promoting medium.

Adjuvants such as colorants, film forming agents, and stabilizing agents, can be present in the sol precursor or bloating agent in an amount in the range of 0 to 10 weight percent of the sol precursor.

Concentration of mixtures described above can conveniently be accomplished by evaporation in a evacuated rotating flask using commercial roto-evaporators (e.g. Büchi/Brinkmann rotary evaporator, Westbury, N.Y.). Briefly, rotoevaporation involves evaporating a liquid from an externally heated rotating vessel into a cooled receiving flask, often conducted under reduced pressure.

A mixture, comprised of sol precursor, adjuvants such as film forming agent, and bloating agent is added, as droplets or microdroplets, to a heated bubble promoting medium. Any means to form the above droplets is suitable such as spraying, atomizing, addition via syringe, and other means known in the art. The microbubbles are best formed by atomizing. By atomizing is meant breaking the sol precursor into micro-size droplets by a combination of pressurized air, about 0.4 to 1.1 kg/cm$^2$, preferably 0.7 kg/cm$^2$ (5 to 15, preferably 10 pounds per square inch gauge pressure [psig]) and pressurized sol precursor, about 0.4 to 1.1 kg/cm$^2$, preferably 0.5 kg/cm$^2$ (5 to 15 psig, preferably 7 psig) when sprayed through an atomizing nozzle.

As the droplets are introduced into the heated bubble promoting medium, a concomitant combination of bloating of the droplets and gel formation provides green microbubbles.

The resultant gelled or green microbubbles can be removed from the bubble promoting medium by filtration (the bubble promoting medium filtrate can be recycled), and fired to provide ceramic microbubbles. Preferably, the bubbles are first washed with a suitable organic solvent such as ethanol (for the purpose of removing residual bubble promoting medium), mixed with a source of pure wood cellulose such as commercial SolkaFloc TM (James River Corp., Berlin, N.H.) and this mixture is then fired in an oxidizing atmosphere (air for example). Firing of the resultant bubbles to a temperature sufficient to cause densification produces sturdy, spherical, transparent, thin-walled, impermeable (i.e., essentially resistant to flow or diffusion of fluids) ceramic bubbles.

Depending upon the particular sol precursor and firing temperature used, walls of the fired ceramic bubbles can be porous and heat sealable or dense and impermeable. The metal oxide in the bubble walls is present in whole or in part in the polycrystalline state or in an amorphous state capable of conversion, upon further firing, to the polycrystalline state. Higher temperatures can act to make the bubble walls impermeable by sealing off porosity or by densification. For example, dried, gelled microbubbles made from alumina-boria silica (ABS), can be fired at 850° C. to form impermeable, ceramic microbubbles having transparent amorphous walls, or further fired to 1000° C. to provide a polycrystalline phase of aluminum borosilicate and an amorphous phase.

In general, higher firing temperatures in the range of 1000° C. to 1400° C. help to achieve hollow microbubbles with fully dense walls. In the firing process, these bubbles are loosely packed with a source of carbon to obtain a uniform, free flowing fired product. The carbon source, preferably in the form of wood cellulose which is free of undesirable impurities such as sulfur, can act as a reducing agent for the conversion of oxide to non-oxide ceramic.

We have also found that the sintering temperatures of these sol-gel derived ceramic bubbles are hundreds of degrees below the temperatures that are required to convert conventional ceramic powder processed products to crystalline and dense ceramics as heretofore taught in the art. For example, the carbothermal reduction of TiO$_2$ by carbon followed by nitriding with nitrogen and/or ammonia gas has been shown to require high temperatures, e.g. 1600° C. (see for example, M. Yoshimura, M. Nishioka, and S. Somiya, *J. Mater. Sci. Lett.* 6 1463 (1987)). By following the procedure described herein we have prepared fully converted, fine microstructured titanium nitride ceramic bubbles from titania microbubbles at a temperature below 1400° C.

As already discussed, certain parameters can be considered and optimized to obtain well-formed hollow microbubbles. For example, concentration and hence, viscosity, of the mixture comprising the sol precursor, bloating agent, film forming agent, and other adjuvants, temperature range of the bubble promoting medium, and manner of addition of the mixture, in droplet form, to the bubble promoting medium can be varied in order to determine the optimum process to derive ceramic bubbles of a certain selected average diameter and wall thickness. Optimum values for these parameters can vary for different sol-gel precursors and their mixtures; that is, conditions to produce alumina-boria-silica microbubbles will not necessarily be the same as those for alumina-magnesia microbubbles. By choice of the proper conditions for these parameters, one can provide well-formed, spherical microbubbles having a single central cavity with walls of relatively uniform thickness. The term "relatively uniform" in this invention means that the wall thickness does not vary by more than 2% of the bubble diameter.

As previously described, viscosity of the sol precursor mixture would be in the range of 50-1000 cP. This viscosity range will limit the solid concentration range which can be used for a particular sol mixture. In general, raising the solids concentration is accompanied by an increase in viscosity. Use of higher solids concentrations or higher viscosity sols results in thicker walls and smaller diameters for bubbles generated from a particular precursor droplet size.

Concentration of the bloating agent can also be varied so as to change the size and wall thickness of the bubbles generated for a particular precursor droplet size. For constant sol concentration and droplet size, increasing the bloating agent concentration increases the average diameter and decreases the average wall thickness of the resulting bubbles. The ratio in parts by volume of sol precursor to bloating agent can be in the range of (70-99):(1-30).

Temperature of the bubble promoting medium affects the size, wall thickness and quality of the inventive bubbles. Up to a certain limit, raising the temperature of the bubble promoting medium results in larger, thinner walled bubbles. This temperature limit depends on the concentration of the sol, nature of the sol and concentration of the bloating agent. Exceeding this temperature limit results in an increase in the percentage of broken bubbles in the final product. Raising the concentration of the bloating agent lowers this temperature limit. In general, raising the sol concentration raises this temperature limit. Further addition of various polymeric additives or film forming agents to the sol precursor can also raise this temperature limit. Temperature of the bubble promoting medium is maintained at 50° to 150° C., preferably 80°-100° C., and most preferably at 90°-97° C.

To improve the physical and mechanical properties of the ceramic microbubbles produced by the method of this invention, defects or flaws in the form of broken bubbles and holes should be prevented. Imperfections in the form of holes can be minimized by gelling the bubbles before the bubbles are allowed to contact each other. Bubbles can be broken by exposing the bubbles to an excessively high temperature of the bubble promoting medium or by incorporating an excess of the bloating agent, or a combination thereof.

Annealing and heat treatment steps in the hot bubble promoting medium assist in yielding intact, denser, and stronger gel bubbles by allowing the nascent, individual gel bubbles to gel completely as separate particles in the hot bubble promoting medium before contacting other particles during separation. The gelled bubbles need to be annealed at lower temperatures (e.g., about 60°–80° C.) after the bubble generation. After the annealing step, the bubbles are hardened by exposure to higher temperatures, e.g., 80° C. up to 115° C., before separating the bubbles from the bubble promoting medium.

Wall thickness of the bubbles can be controlled by a combination of suitable bloating agent, concentration, and viscosity of the sol precursor mixture; these parameters having been discussed above. Wall thickness can be measured by scanning electron microscopy (SEM) or transmission electron microscopy (TEM).

Microbubbles of the invention are formed by the equilibrium boiling point method. Temperatures which are suitable for the equilibrium boiling point method are dependent on the nature of the bloating agent, concentration of the bloating agent, concentration of the sol precursor, the manner in which the sol precursor gels, and the physical characteristics of the bubble promoting medium. Generally, the temperature will be in the range of 80°–100° C., most preferably in the range of 90°–97° C.

This invention also relates to non-oxide ceramic microbubbles and a method for their preparation. In the process of this invention, a reducing agent, e.g., a source of carbon such as wood cellulose is mixed with the green bubbles prior to the firing step. The firing step can be carried out, for example, in an argon or a nitrogen atmosphere or in a mixture of the two gases. Any atmosphere may be used that will not be detrimental to the conversion of the gelled miorobubbles to the desired non-oxide ceramic microbubbles. Where non-oxide bubbles are desired, those containing less than 5% oxide are preferred.

More particularly, we have discovered that green oxide-containing microbubbles prepared as described above, when fired in a bed of wood cellulose powder in the presence of a reduction supporting atmosphere of noble and certain reactive gases such as argon, xenon, neon, helium, or nitrogen or mixtures thereof yield electrically conductive, fine microstructured (as determined by SEM) non-oxide ceramic microbubbles. They are mostly in the form of carbides and nitrides. By reduction supporting atmosphere is meant any atmosphere which supports or at least is not detrimental to the conversion of oxide containing ceramics to non-oxide containing ceramics. X-ray diffraction (XRD) results show that a mixture of oxides and carbides, for example, in the case of ceramic bubbles derived from zirconyl acetate and using wood cellulose as a reducing agent, a mixture of ZrC and $ZrO_2$ is produced below 1480° C. in an argon atmosphere. Above that temperature, the only crystalline phase detected was zirconium carbide.

When unfired or green titanium oxide containing microbubbles, prepared as described above, were fired in a bed of wood cellulose powder in the presence of a nitrogen atmosphere, there was obtained electrically conductive, fine microstructured (as determined by SEM) ceramic microbubbles of titanium nitrides. X-ray diffraction results revealed that a mixture of nitrides and oxides was produced below 1420° C. in a nitrogen atmosphere, and above that temperature, the only crystalline phase detected was titanium nitride.

Non-oxide microbubbles of this invention have the following general characteristics: diameter of about 1–300 micrometers; electrical resistivities of about 0.02–0.2 ohm.cm (as measured by a Simpson Ampere meter (Simpson Electric Co., Chicago, Ill.), and are colored, depending on the composition. The walls can be fully dense with smaller than 0.1 micrometer grains or crystallites. For example, titanium carbide is black and non-transparent and both titanium nitride and zirconium nitride are gold colored.

While not being bound by theory, it is believed that during firing of the green or oxide containing ceramic microbubbles in the presence of both a reduction supporting atmosphere and a source of carbon such as wood cellulose, the wood cellulose is reduced to carbon or a carbon-containing intermediate phase, which causes conversion of the green or oxide containing ceramic microbubbles to non-oxide containing ceramic microbubbles.

We have further discovered that firing temperatures to effect this conversion occur at about 300° C. below those firing temperatures necessary to convert a mixture of usual oxide-containing ceramic powder with powdered carbon to non-oxide-containing ceramic powder. Moreover, scanning electron microscope (SEM) micrographs showed that the sizes of individual crystallites present in the bubble wall of microbubbles of this invention were smaller than 0.1 micrometers and X-ray diffraction (XRD) studies revealed that the only crystalline phase found in the bubbles was nitride (e.g., TiN, formed at a firing temperature of 1360° C., and ZrN, 1420° C.) or carbide (TiC, 1420° C.; ZrC, 1480° C.). Electrical resistivity (reported in ohm times cm, ohm.cm) of various non-oxide ceramic microbubbles, firing temperature, and reduction supporting atmosphere are summarized in Table 1.

Hollow ceramic microbubbles in the oxide form having wall thicknesses of about 1 to about 8 percent of the diameter of the bubble and bubble diameters of about 1 to about 300 micrometers can be obtained. Microbubbles of this invention are uniform in shape and wall thickness, transparent, tough, durable, highly resistant to scratching, chipping, and cracking.

Voids in the walls of the hollow microspheres of the invention are desirably averted, by firing the gelled microsphere precursors to a dense state at a temperature of 600° C. or higher. This improves transparency, prevents both structural gaps or defects and any accompanying weakening effects and absorption of moisture or other liquids that can degrade the microspheres. In general, higher firing temperatures promote densification of the walls of the ceramic microspheres. Depending on the particular oxide precursor material and firing temperature used, the walls of the fired ceramic bubbles will be porous and heat-sealable or impermeable. In general, the temperature required to seal the non-oxide bubbles will be higher than that required to seal the oxide bubbles. For example, $TiO_2$ bubbles can be sealed at temperatures in the range of 600° to 700° C. Titanium nitride can be sealed at about 1360° C.

Pressure within the sealed microbubbles will be dependent upon the temperature at which sealing is accomplished and the pressure of the select gas at that temperature. Thus, the pressure of the select gas and its pressure within the sealed microbubbles can be varied over a wide range, from sub-atmospheric (vacuum) to super-atmospheric, i.e., from 0.0001 to 2.0 or more atmospheres, preferably 0.5 atmospheres to 2.0 atmospheres (380 to 1520 Torr), and predetermined or approximated according to the gas laws. This process allows encapsulation of very pure gases and preselected combinations of gases.

Microbubbles of this invention may be truly spherical but they may be slightly oblate or prolate. Generally, they are spherical. Preferred ceramic microbubbles are also generally characterized by: diameters in the range of 1-300 micrometers, wall thickness preferably in the range of 1-8 percent of the diameter of the microbubble, smooth surface and density of 0.3 to 0.6 g/cm$^3$. By smooth surface is meant that the surface roughness is less than 2500 Angstrom units where surface roughness is defined as the average height of repeating or regular surface protuberances as measured vertically from the bottom to the apex of the protuberance using scanning electron microscopy (SEM).

Most metal oxides form a polycrystalline or microcrystalline phase. Additives such as yttrium oxide can form solid solutions with other oxides, such as zirconia, resulting in the stabilization or partial stabilization of the metal oxide (e.g. zirconia in the cubic or tetragonal form).

As taught in U.S. Pat. No. 4,349,456 and applicable in this invention, hydrogen or other reducing atmosphere can be used where desired to form ceramic microbubbles comprising reduced metal oxides, e.g. ferrous oxide, or metals, e.g. iron. Inert atmospheres, e.g. argon, nitrogen, xenon, neon, or helium, can be used, particularly where it is desired to form ceramic microbubbles with such inert atmospheres filled and heat-sealed therewith. Generally, where it is desired to form sealed ceramic microbubbles with a vacuum or select gas (other than air) encapsulated therein, it will be convenient to use an air atmosphere to convert the dried, gelled microbubbles to porous ceramic microbubbles and then heat-sealed by firing the latter at a high enough temperature, in a range from 500° to 1400° C. depending on the ceramic, to render the porous wall impermeable in a vacuum or an atmosphere of the select inert gas as noted above. The resultant bubbles will contain the vacuum or selected gas within its single cavity. Ceramic bubbles containing a reducing atmosphere (e.g., carbon monoxide or hydrogen) can also be prepared by firing in the appropriate atmosphere. During the firing stages, if oxygen is present, the surface of the bubbles can be made to be oxygen-rich.

TABLE 1

| Electrical Resistivity of Non-oxide Ceramic Microbubbles | | | |
|---|---|---|---|
| Bubble composition* | Firing Temp. (°C.) | Atmosphere | Resistivity (ohm · cm) |
| TiC | 1420 | Argon | 0.02 |
| TiN | 1420 | Nitrogen | 0.05 |
| ZrC | 1480 | Argon | 0.20 |
| ZrN | 1420 | Nitrogen | 0.09 |

*all bubbles had grain size less than 0.1 micrometer

Experimental details and some physical characteristics for various microbubbles of this invention are summarized in Table 2.

Some physical and mechanical properties of $3Al_2O_3.1B_2O_3.2SiO_2$ composition ceramic microbubbles are recorded in Table 3.

Some firing conditions and crystallite characteristic of some bubbles of this invention are given in Table 4.

TABLE 2

| No. | Composition | Starting materials | Bloating agent | Film forming agent | % Fired solids (w/o) | Bubble promoting medium | Firing temp. (°C.) | Bubble size (μm) | Wall thickness (% of bubble diameter) |
|---|---|---|---|---|---|---|---|---|---|
| 1 | Alumina-boria-silica ($3Al_2O_3.1B_2O_3.2SiO_2$) | 40 g ABS$^a$ sol precursor, deionized water [1]** | 20 g acetone [2] | 0.8 g methyl cellulose powder [3] | 13.1% | oleyl alcohol (95° C.) | 900 | 5-100 | 1-2% |
| 2 | Alumina-boria-silica ($3Al_2O_3.1B_2O_3.2SiO_2$) | 392 g ABS sol precursor, 314 g D.I. water [1] | 48.2 g (43.4 cc) Freon 11/ methanol (50/50 vol.) [2] | 3.9 g methyl cellulose powder [3] | 17.1% | oleyl alcohol (97° C.) | 950 | 1-60 | 1-3% |
| 3 | Alumina-boria-silica ($3Al_2O_3.1B_2O_3.2SiO_2$) | 392 g ABS sol precursor, 122 g D.I. water [1] | 48.2 g Freon 11/ methanol (50/50 vol.) [3] | 196 g 2% methyl cellulose powder solution [2] | 17.1% | oleyl alcohol (95° C.) | 950 | 1-60 | 1-3% |
| 4 | Alumina-boria-silica ($3Al_2O_3.1B_2O_3.2SiO_2$) | 359 g ABS sol precursor, 111 g D.I. water [1] | 71.9% acetone [3] | 180 g 2% methyl cellulose powder solution [2] | 16.4% | oleyl alcohol (95° C.) | 950 | 1-60 | 1% |
| 5 | $ZrO_2$ | 554 g zirconyl acetate, 61.51 g colloidal zirconia, 76.01 g $Y(NO_3)_3.6H_2O$ [1] | 48.2 g (43.4 cc) Freon 11/ methanol (50/50 vol.) [3] | 56.3 g 2% methyl cellulose powder solution [2] | 21.1% | oleyl alcohol (95° C.) | 600 | 2-80 | 1-2% |
| 6 | $3Al_2O_3.2SiO_2$ | 1500 g | 184 g | 750 g of | 17.1 % | oleyl | 950 | 1-60 | 1-3% |

TABLE 2-continued

| No. | Composition | Starting materials | Bloating agent | Film forming agent | % Fired solids (w/o) | Bubble promoting medium | Firing temp. (°C.) | Bubble size (μm) | Wall thickness (% of bubble diameter) |
|---|---|---|---|---|---|---|---|---|---|
| | with 2 w/o[b] $B_2O_3$ | sol, 465 D.I. water | (166 cc) Freon 11/ methanol (50/50 vol.) | 2% methyl cellulose powder solution | | alcohol (95° C.) | | | |
| 7 | $ZrO_2$ | [1] 615 g zirconyl acetate, 76.01 g $Y(NO_3)_3.6H_2O$ | [3] 48.2 g (43.4 cc) Freon 11/ methanol (50/50 vol.) | [2] 56.3 g 2% methyl cellulose powder solution | 19.3% | oleyl alcohol (95° C.) | 950 | 2–80 | 1–2% |
| 8 | Mullite $(3Al_2O_3 \cdot 2SiO_2)$ | [1] 500 g concentrated mullite sol (mixture of A.F.A.[*] and Nalco 2326), 70.8 g DMF[+] | [3] 50.9 g (45.8 cc) Freon 11/ methanol (50/50 vol.) | [2] 137 g 2% methyl cellulose powder solution | 13.2% | oleyl alcohol (95° C.) | 950 | 2–80 | 1% |
| 9 | Mullite $(3Al_2O_3 \cdot 2SiO_2)$ | [1] 500 g concentrated mullite sol (mixture of A.F.A. and Nalco 2326), 76.1 g DMF | [3] 47.6 g acetone | [2] 137 g 2% methyl cellulose powder solution | 13.1% | oleyl alcohol (95° C.) | 950 | 2–80 | 1% |
| 10 | $3Al_2O_3 \cdot 1B_2O_3 \cdot 2SiO_2$ | [1] 83.0 ABS sol precursor 66.3 g D.I. water | [3] 10.2 g (9.2 cc) Freon 11/ methanol (50/50 vol.) | [2] 0.8 g 2% methyl cellulose powder solution | 17.1% | mixture of oleyl alcohol and peanut oil (50/50 vol.) (95° C.) | 950 | 40–120 | 2% |
| 11 | $3Al_2O_3 \cdot 1B_2O_3 \cdot 2SiO_2$ | [1] 1,500 g ABS sol precursor, 1,500 g D.I. water | [3] 400 g acetone, 30 g isopropanol | [2] 30 g methyl cellulose powder 149 g PVP[x] (50%) solution | 13.7% | oleyl alcohol (95° C.) | 950 | 1–20 | 1% |
| 12 | $3Al_2O_3 \cdot 2SiO_2$ with 2 w/o $B_2O_3$ | [1] 50 g sol 115 g D.I. water | [2] 17.7 g acetone | [3] 1.0 g methyl cellulose powder | 9.0% | oleyl alcohol (92° C.) | 1,200 | 1–15 | <1% |
| 13 | $3Al_2O_3 \cdot 1B_2O_3 \cdot 2SiO_2$ | [1] 50 g ABS sol precursor 115 g D.I. water | [2] 17.6 g acetone, 3.7 g isopropanol | [3] 1.0 g methyl cellulose powder | 9.0% | oleyl alcohol (92° C.) | 950 | 1–30 | <1% |
| 14 | $ZrO_2$ | [1] 2.2 Kg zirconyl acetate, 270 g $Y(NO_3)_3.6H_2O$ | [2] 291 g acetone | [3] 27 g methyl cellulose powder | 21.7% | oleyl alcohol (97° C.) | 1,030 | 5–80 | 2–3% |
| | | [1] | [2] | [3] | | | | | |

[a] aluminum borosilicate sol precursor, see U.S. Pat. No. 3,795,524
[**] numbers in [ ] indicate the successive mixing order
[*] AFA (Aluminum formoacetate), [+] DMF (Dimethylformamide)
[x] PVP (Polyvinylpyrrolidone) K-30 ™ (General Aniline and Film Corp., NY)
Dow H6 4000 cP Methocel
Dow K15M 15,000 cP Methocel
[b] means weight percent fired oxides

TABLE 3

Physical and Mechanical Properties of $3Al_2O_3.1B_2O_3.2SiO_2$ composition ceramic microbubbles

| Sample No. | Density (g/cc) Air pycnometer | Bulk | Floaters[1] | Packing factor[2] | Crush strength[3] % collapse 10% | 20% |
|---|---|---|---|---|---|---|
| A[4] | 0.32 | 0.12 | 0.53 | 39 | 197 (2800) | 844 (12,000) |
| B[5] | 0.66 | 0.33 | 0.54 | 50 | 323 (4600) | 1125 (16,000) |
| C[6] | 0.76 | 0.32 | 0.59 | 42 | 197 (2800) | 253 (3600) |

[1]Density was determined on those microbubbles that floated on ethanol, all contained in a separatory funnel. Contents of the separatory funnel were vigorously agitated (shaken) and allowed to settle. Density was determined on the floating microbubbles and the percent yield was determined to be the weight of the floating fraction divided by the total weight of the sample. Broken microbubbles and those with holes sank in ethanol during the agitation process.
[2]Packing factor was determined by dividing the bulk density by the true density. True density was determined following ASTM procedure D2840-69 "Standard Test Method for Average True Particle Density of Hollow Microspheres".
[3]Crush strength, reported in kilograms per square cm and parenthetically in pounds per square inch was measured according to ASTM procedure D3102-78 "Standard Practice for Determination of Isostatic Collapse Strength of Hollow Glass Microspheres" using glycerol in place of water.
[4]Unfired sample, 16.5% solids.
[5]Unfired sample, 20% solids.
[6]Sample fired at 950° C.

TABLE 4

| Starting Materials | | Firing Conditions | | Cystallite Phases | Crystallite Size ($\mu m$) | Resistivities ($\Omega \cdot cm$) |
|---|---|---|---|---|---|---|
| zirconyl acetate gel bubbles ($\phi$ :20-100 $\mu m$, thickness: 0.2-1 $\mu m$) | with cellulose fiber powder | 1360° C., 2 hrs | Ar atmos N$_2$ atmos | $ZrC^{100}$, $ZrO_2(T)^{60}$, $ZrO_2(M)^{19}$ $ZrN^{100}$, $ZrO^2(T/C)^5$ | | |
| | | 1420° C., 2 hrs | Ar atmos N$_2$ atmos | $ZrC^{100}$, $ZrO_2(T)^8$, $ZrO_2(M)^3$ ZrN | 0.5~1 <0.1 | 0.2 0.09 |
| | | 1480° C., 1 hrs | Ar atmos | ZrC | <0.1 | 0.2 |
| | | 1480° C., 2 hrs | N$_2$ atmos | ZrN | <0.1 | 0.09 |
| | without cellulose fiber powder | 1480° C., 2 hrs | Ar atmos N$_2$ atmos | $ZrC^{100}$, $ZrO_2(M)^{74}$ $ZrO_2(C)^{100}$, $ZrN^{74}$, $ZrO_2(M)^{41}$ | 0.5-1 ~1.5 | |
| TiO$_2$ gel bubbles ($\phi$ :20-100 $\mu m$, thickness: 0.2-1 $\mu m$) | with cellulose fiber powder | 1360° C., 2 hrs | Ar atmos N$_2$ atmos | $TiC^{100}$, $Ti_2O_3^{22}$ TiN | | |
| | | 1420° C., 2 hrs | Ar atmos N$_2$ atmos | TiC TiN | <0.1 <0.1 | 0.02 0.05 |
| | | 1480° C., 2 hrs | Ar atmos N$_2$ atmos | TiC TiN | <0.1 <0.1 | 0.02 0.02 |
| TiO$_2$.Al$_2$O$_3$ gel bubbles ($\phi$: 20-100 $\mu m$, thickness: 0.02-1 $\mu m$) | without cellulose fiber powder | 1480° C., 30 min. | N$_2$ atmos | $\alpha$-$Al_2O_3^{100}$, $TiN^{76}$ | ~0.5 | |
| | with cellulose fiber powder | 1750° C., 1 hr | N$_2$ atmos. | $TiN^{100}$, $AlN^{35}$ | <0.1 | |

$\phi$: diameter.
ZrO$_2$(M): Monoclinic,
ZrO$_2$(T): Tetragonal,
ZrO$_2$(C): Cubic Articles comprising microbubbles of this invention can be fabricated into useful three dimensional shapes. For example, combining the microbubbles of this invention with various binder materials such as water glass, polymers such as epoxy resins, and sol-gel derived binders can provide low density structural reinforcement composites, catalyst substrates, machinable refractories, and supports. In addition, the microbubbles can be used as carriers for drugs and the like for applications where controlled release is desired.

Objects and advantages of this invention are further illustrated by the following examples, but the particular materials and amounts thereof recited in these examples, as well as other conditions and details, should not be construed to unduly limit this invention.

EXAMPLES

Sample Nos. 1-14 (see Table 2) describe oxide-containing microbubbles. Example 1 is representative for the preparation of oxide-containing microbubbles and details for their preparation are conveniently summarized in Table 2, above.

EXAMPLE 1

The following example describes the preparation of $3Al_2O_3.1B_2O_3.2SiO_2$ composition ceramic microbubbles using acetone as a bloating agent and oleyl alcohol as a bubble promoting medium.

Aluminum borosilicate sol precursor (40 g) having the calculated composition $3Al_2O_3.1B_2O_3.2SiO_2$ (see U.S. Pat. No. 3,795,524) was diluted with water to make a 16.5% fired solids solution. 20 g acetone and 0.8 g methyl cellulose (Methocel TM, Dow Chemical Co., Midland, Mich.) were added with stirring to 80 g of the diluted aluminum borosilicate sol. The mixture (13.1% fired solids) was covered, to prevent evaporation, with inert wax sheeting (Parafilm M TM, American Can Co., Greenwich, Conn.) and stirred until the initial white floc which formed dissolved. This sol was broken up by atomization and was sprayed into hot (95° C.) oleyl alcohol. An atomizer from a spray-dryer, (Buchi, Switzerland) was positioned 9.5 cm (3.75 inches) from the surface of the hot oleyl alcohol. The air and sol feeding pressures to the atomizer were 0.7 kg/cm² (10 psi) and 0.5 kg/cm² (7 psi) respectively. The droplets formed small bubbles and floated on the surface of the oleyl alcohol. The stirred mixture was maintained at 95° C. for 15 minutes The gelled bubbles were separated by filtration, placed on a quartz dish and fired from room temperature to 900° C. in air at the rate of 100° C./hour and held at this temperature for 1 hour. The sample was then allowed to cool with the furnace. Examination with a microscope revealed that a large fraction of the bubbles were clear and intact and in the range of 5-100 micrometers in diameter with wall thicknesses of 1-2% of the total diameter.

EXAMPLE 2

This example describes an $3Al_2O_3.1B_2O_3.2SiO_2$ composition hollow microbubbles using a bloating agent mixture and a gelling schedule different from that used in Example 1.

Aluminum borosilicate sol precursor (392 g) having the calculated composition $3Al_2O_3.1B_2O_3.2SiO_2$ (see U.S. Pat. No. 3,795,524) was diluted with 122 g deionized (D.I.) water and 196 g 2% Methocel ™ (15,000 cps) solution was mixed with that sol. A mixture of pressurized liquid fluorocarbon (Genetron ™ 11, Allied Chemical Co., Morristown, N.J.)/methanol (48.2 g, 50/50 volume) mixture was added with stirring to 710 g of the diluted aluminum borosilicate sol precursor having the calculated composition $3Al_2O_3.1B_2O_3.2SiO_2$ (see U.S. Pat. No. 3,795,524) with the film forming agent. The mixture (17.1% fired solids) was covered with Parafilm ™ and stirred until the initial white floc which formed dissolved. This sol was broken up by atomization and was sprayed into 18 liters of hot (95° C.) oleyl alcohol which was stirred to let the individual bubbles separate in the swirling hot medium. After finishing generation of the gel bubbles at 95° C., the gel bubbles were annealed at lower temperature (70° C.) first, followed by exposure to higher temperature, up to 105° C., before cooling to room temperature. The gel bubbles in hot medium were kept from agglomerating by stirring as the oil was allowed to cool down to room temperature. The gel bubbles were separated by filtration, placed on a quartz dish and fired from room temperature to 950° C. in air at the rate of 100° C./hour and held at this temperature for 1 hour. The sample was then allowed to cool with the furnace. Examination with a microscope revealed that a large fraction of the fired bubbles were 1-60 micrometers in diameter with wall thicknesses of 1-3 percent of the total diameter and were clear and intact.

EXAMPLE 3

With rapid stirring, 78 g of ammonia stabilized colloidal silica (Nalco ™ 2326, Nalco Chemical Co., Oak Brook, IL) was diluted 5 fold with 389 g D.I. water and quickly acidified by the addition of about 0.5 ml of concentrated $HNO_3$. This acidified silica sol was slowly added to a rapidly agitated solution of 319 g of aluminum formoacetate (9.5% aluminum oxide) [for preparation see Kirk-Othmer, Encyclopedia of Chemical Technology, third ed., Vol. 2, 202-204 (1978)]. The resulting mixture was concentrated by evaporation in an evacuated rotating flask to about twenty percent fired solids. To this was added in turn 10 g of lactic acid, 18 g of dimethylformamide (DMF), 48 g of acetone, and 2.13 g of Methocel powder (15,000 cP), and the resulting mixture was stirred until the initial white floc which formed and methocel powder were dissolved. The gelled microspheres were prepared as described in Example 2 using oleyl alcohol maintained at 92°-95° C. The gel bubbles were separated by filtration and washed with ethanol, placed on a quartz dish and fired from room temperature to 1200° C. in air at the rate of 100° C./hour schedule and held at this temperature for 1 hour and cooled to room temperature. The resulting ceramic microbubbles were rigid, free-flowing, smooth-surfaced, homogeneous, transparent, and spherical, and had diameters up to about 200 micrometers and uniform wall thicknesses of approximately 1-2 micrometers.

X-ray diffraction analysis confirmed that the ceramic microbubbles were polycrystalline Mullite.

Examples 4-6 describe non-oxide-containing microbubbles. Example 4 is representative for the preparation of non-oxide-containing microbubbles and details for their preparation are conveniently summarized in Table 4.

EXAMPLE 4

Zirconyl acetate (100 g; Harshaw-Filtro, Cleveland, Ohio) was diluted with water to make a 15% fired solids solution. Polyvinylpyrrolidone (18 g, 5% solution; PVP-K30 ™, General Aniline & Film Corp., New York, N.Y.), 16.5 g of acetone, and 1.5 g of Methocel were added with stirring to 167 g of the diluted acetate sol. The mixture was covered with Parafilm and stirred until the initial white floc which formed dissolved. This sol was broken up by atomization and was sprayed into hot (95° C.) oleyl alcohol. The atomizer was positioned 9.5 cm (3.75 inches) from the surface of the hot oleyl alcohol. The droplets formed small bubbles and floated on the surface of the oleyl alcohol. The stirred mixture was maintained at 95° C. for 15 minutes. The gelled bubbles were separated by filtration, washed with ethanol and mixed with cellulose fibers (Solka-Floc ™ SW40, James River Corporation, Berlin, N.H.) at the wt. ratio of ¼ before refiltration and drying at 80° C. for 2 hours. Those mixtures of gel bubbles ($ZrO_2$ composition) and Solka-Floc powders were placed in a graphite mold (closed system) and fired to 1420° C. and 1480° C. in $N_2$ and Ar atmospheres by a controlled schedule (room temperature up to 1200° C. over a period of 2 hours, then 1200° C. up to 1420° C. and 1480° C., respectively, over a period of 1.5 hours) and held at these temperatures for 2 hours. The samples were then allowed to cool with the furnace XRD results of these samples showed that the only crystal phases found in the samples ($ZrO_2$ base bubbles fired to 1420° C. and 1480° C. in $N_2$ and Ar atmospheres) were ZrN and ZrC respectively. Examination with a SEM revealed that the size of individual crystallites present in the walls of bubbles of diameters 20-100 micrometers and wall thickness of 0.2-1 micrometer was smaller than 1/10 micrometer for the bubble samples with the nitride or carbide phases. Electrical resistivities of ZrN bubbles and ZrC bubbles, prepared by this method were 0.09 and 0.20 ohm.cm respectively. The colors of nitride bubbles fired to 1420° C. for 2 hours were gold and carbide bubbles fired to 1480° C. were black.

EXAMPLE 5

DMF (dimethylformamide, 10 g) and acetone (10 g) were added with stirring to a mixture of 77.5 g of aluminum formoacetate (9.5% aluminum oxide) [for preparation see Kirk-Othmer, Encyclopedia of Chemical Technology, third ed., Vol. 2, 202-204 (1978)] and 32 g of titanium lactate sol (TYZOR LA ™; E.I. DuPont de Nemours & Co. Inc., Wilmington, Del.). The resulting mixture was covered with Parafilm and stirred until the initial white floc which formed dissolved. This sol was broken up by atomization and was sprayed into hot (95° C.) oleyl alcohol. The atomizer was again positioned 9.5 cm (3.75 inches) from the surface of the hot oleyl alcohol. The droplets formed small bubbles and floated on the surface of the oleyl alcohol. The stirred mixture was maintained at 95° C. for 15 minutes. The gelled bubbles were then mixed with Solka-Floc in oleyl alcohol and the mixture was separated by filtration, placed in a BN crucible and fired to 1750° C. under $N_2$ atmosphere according to a controlled schedule (room temperature up to 1000° C. over a period of 20 min., then 1000° C. up to 1750° C. at the rate of 25° C./min.) and held at this temperature for 1 hour. The sample was then allowed to cool with the furnace. Examination with a microscope revealed that a large fraction of the bubbles were 20-100 micrometers in diameter with wall thicknesses of 1-2 percent of the total diameter and were intact. SEM micrographs showed that the sizes of individual crystallites present in the wall of this bubble sample were smaller than 1/10 micrometer. XRD analysis of this bubble sample revealed that the crystal phases in the sample were TiN and AlN.

EXAMPLE 6

DMF (10 g) and acetone (10 g) were added with stirring to the mixture of 78 g of aluminum formoacetate (9.5% aluminum oxide) [for preparation see Kirk-Othmer, Encyclopedia of Chemical Technology, third ed., Vol. 2, 202-204 (1978)] and 32 g of titanium lactate sol (TYZOR LA). The resulting mixture was stirred for approximately 30 minutes and then injected into 90°-95° C. oleyl alcohol using an atomizer with 69 KPa (10 psi) air pressure. The droplets formed small bubbles and floated on the surface of the oleyl alcohol. The stirred mixture was maintained at 95° C. for 15 minutes. The gelled bubbles were separated by filtration and fired to 1480° C. for 30 minutes in $N_2$ atmosphere. XRD analysis of these bubbles showed that $Al_2O_3$ and TiN phases were present in the sample.

The zirconia gel bubbles produced in Example 4 were fired to 1480° C. for 2 hours in $N_2$ and Ar atmospheres without aid of Solka-Floc or carbon black powder. The crystalline phases found by XRD analysis in the sample fired to 1480° C. in an argon atmosphere were ZrC and monoclinic $ZrO_2$ and in the sample fired to 1480° C. in nitrogen atmosphere were cubic zirconia, zirconium nitride, and monoclinic zirconia.

Various modifications and alterations of this invention will become apparent to those skilled in the art without departing from the scope and spirit of this invention, and it should be understood that this invention is not to be unduly limited to the following illustrative embodiments set forth herein.

We claim:

1. A method of preparing green microbubbles comprising the steps of:
   a) adding droplets of a mixture comprising at least one of an oxide and a non-oxide sol precursor and a volatile liquid bloating agent, said sol precursor and bloating agent being miscible, to a bubble promoting medium, said bubble promoting medium being maintained at a temperature in the range of 50° to 150° C., said bloating agent having a boiling point below the temperature of the bubble promoting medium to provide green, hollow, gas-filled microbubbles, and
   b) isolating the resulting green microbubbles.

2. The method according to claim 1 further comprising the step of firing said green microbubbles to provide ceramic microbubbles.

3. The method according to claim 2 wherein said firing step takes place in the presence of an agglomeration preventative agent.

4. The method according to claim 2 wherein said ceramic microbubbles comprise at least one of oxide- and non-oxide phases or components.

5. The method according to claim 2 wherein said bloating agent has a boiling point in the range of 25° to 100° C. at atmospheric pressure.

6. The method according to claim 5 wherein said bloating agent is selected from the group consisting of halocarbons, aldehydes, alcohols, ethers, ketones, and combinations thereof.

7. The method according to claim 2 wherein said bloating agent is selected from the group consisting of 1) acetone, and 2) 1/1 vol/vol liquid halocarbon and methanol.

8. The method according to claim 2 wherein said bubble promoting medium is selected from the group consisting of esters of long chain fatty acids and derivatives thereof and long chain alcohols and combinations thereof.

9. The method according to claim 8 wherein said bubble promoting medium comprises a vegetable oil.

10. The method according to claim 8 wherein said bubble promoting medium comprises oleyl alcohol.

11. The method according to claim 3 wherein said agglomeration preventative agent is a carbon-containing material.

12. The method according to claim 2 wherein said firing step takes place in an atmosphere selected from the group consisting of reducing, inert, and oxygen-containing atmospheres.

13. The method according to claim 12 wherein said firing step takes place in an atmosphere at a pressure in the range of sub-atmospheric to super-atmospheric.

14. The method according to claim 1 wherein said temperature is in the range of 90° to 97° C.

15. The method according to claim 2 wherein said firing step takes place at a temperature above 400° C.

16. Free-flowing, discrete ceramic microbubbles consisting essentially of 1) a non-oxide component selected from metal nitrides and metal carbides or 2) said non-oxide component in combination with a metal oxide component, each microbubble having a fine microstructured ceramic wall and a single central gas-filled cavity, said microbubbles having a diameter in the range of 1 to 300 micrometers and a wall thickness of less than 10 percent of the diameter of the microbubbles.

17. The microbubbles according to claim 16 wherein said non-oxide component and oxide components are present in the range of 95:5 to 5:95 parts by weight.

18. The microbubbles according to claim 16 which are essentially 100 weight percent non-oxide containing.

19. The microbubbles according to claim 16 wherein said walls are fully dense.

20. The microbubbles according to claim 16 wherein said microbubble cavities contain a gas.

21. The microbubbles according to claim 20 wherein said gas is an inert or reducing gas or air.

22. The microbubbles according to claim 16 wherein said cavities contain a vacuum.

23. The microbubbles according to claim 16 wherein said ceramic walls are selected from the group consisting of aluminum-, titanium-, zirconium-, and silicon-containing ceramics.

24. The microbubbles according to claim 16 wherein said ceramic comprises a metal oxide and at least one of a metal nitride and a metal carbide.

25. The microbubbles according to claim 16 which are electrically conductive.

26. A shaped article comprising microbubbles according to claim 16.

* * * * *

UNITED STATES PATENT AND TRADEMARK OFFICE
CERTIFICATE OF CORRECTION

PATENT NO. : 5,077,241

DATED : December 31, 1991

INVENTOR(S) : Kyung H. Moh et al.

It is certified that error appears in the above-identified patent and that said Letters Patent is hereby corrected as shown below:

Col. 3, line 49, "glass As" should read -- glass. As --.

Col. 8, line 24, "8°" should read -- 80° --.

Table 2 (in cols. 13-14), under "Film forming agent" item #1, "0.8g methyl cellulose powder" should read -- 0.8g methyl cellulose powder† --.

Table 2 (in cols. 13-14), under "Film forming agent" item #2, "3.9g methyl cellulose powder" should read -- 3.9g methyl cellulose powder‡ --.

Table 2 (in cols. 13-14), under "Film forming agent", item #3, "196g 2% methyl cellulose powder" should read -- 196g 2% methyl cellulose powder‡ --.

Table 2 (in cols. 13-14), under "Film forming agent", item #4, "180g 2% methyl cellulose powder" should read -- 180g 2% methyl cellulose powder‡ --.

Table 2 (in cols. 13-14), under "Film forming agent", item #5, "56.3g 2% methyl cellulose powder" should read -- 56.3g 2% methyl cellulose powder‡ --.

Table 2 (in cols. 15-16), under "Film forming agent", item #6, "750g of 2% methyl cellulose powder" should read -- 750g of 2% methyl cellulose powder‡ --.

UNITED STATES PATENT AND TRADEMARK OFFICE
CERTIFICATE OF CORRECTION

PATENT NO. : 5,077,241

DATED : December 31, 1991

INVENTOR(S) : Kyung H. Moh et al.

It is certified that error appears in the above-identified patent and that said Letters Patent is hereby corrected as shown below:

Table 2 (in cols. 15-16), under "Film forming agent", item #7, "56.3g 2% methyl cellulose powder" should read -- 56.3g 2% methyl cellulose powder‡ --.

Table 2 (in cols. 15-16), under "Film forming agent", item #8, 137g 2% methyl cellulose powder" should read -- 137g 2% methyl cellulose powder‡ --.

Table 2 (in cols. 15-16), under "Film forming agent", item #9, "137g 2% methyl cellulose powder" should read -- 137g 2% methyl cellulose powder† --.

Table 2 (in cols. 15-16), under "Film forming agent", item #10, "0.8g 2% methyl cellulose powder" should read -- 0.8g 2% methyl cellulose powder† --.

Table 2 (in cols. 15-16), under "Film forming agent", item #11, "30g methyl cellulose powder" should read -- 30g methyl cellulose powder† --.

Table 2 (in cols. 15-16), under "Film forming agent", item #12, "1.0g methyl cellulose powder" should read -- 1.0g methyl cellulose powder† --.

Table 2 (in cols. 15-16), under "Film forming agent", item #13, "1.0g methyl cellulose powder" should read -- 1.0g methyl cellulose powder† --.

UNITED STATES PATENT AND TRADEMARK OFFICE
CERTIFICATE OF CORRECTION

PATENT NO. : 5,077,241
DATED : December 31, 1991
INVENTOR(S) : Kyung H. Moh et al.

It is certified that error appears in the above-identified patent and that said Letters Patent is hereby corrected as shown below:

Table 2 (in cols. 15-16), under "Film forming agent", item #14, "27g methyl cellulose powder" should read -- 27g methyl cellulose powder† --.

Table 2 (col. 15), Footnotes, "Dow H6 4000 cP Methocel" should read -- † Dow H6 4000 cP Methocel --.

Table 2 (col. 15), Footnotes, "Dow K15M 15,000 cP Methocel" should read -- ‡ Dow K15M 15,000 cP Methocel --.

Signed and Sealed this

Tenth Day of August, 1993

Attest:

MICHAEL K. KIRK

Attesting Officer

Acting Commissioner of Patents and Trademarks